United States Patent
Kim et al.

(10) Patent No.: US 12,197,403 B2
(45) Date of Patent: Jan. 14, 2025

(54) APPARATUS AND METHOD FOR MANAGING VIRTUAL DATABASE

(71) Applicant: TmaxTibero Co., Ltd., Seongnam-si (KR)

(72) Inventors: Taeseop Kim, Yongin-si (KR); Kwangwon Park, Yongin-si (KR); Kunwoo Park, Seoul (KR); Seunghoon Park, Yongin-si (KR); Sangchul Kim, Seongnam-si (KR); Yongkwon Kim, Hanam-si (KR); Sangmin Kang, Seongnam-si (KR); Joohyun Lee, Namyangju-si (KR); Sangyoung Park, Seoul (KR)

(73) Assignee: TmaxTibero Co., Ltd., Seongnam-si (KR)

( * ) Notice: Subject to any disclaimer, the term of this patent is extended or adjusted under 35 U.S.C. 154(b) by 0 days.

(21) Appl. No.: 18/175,334

(22) Filed: Feb. 27, 2023

(65) Prior Publication Data
US 2024/0232147 A1    Jul. 11, 2024

(30) Foreign Application Priority Data
Jan. 11, 2023   (KR) .................. 10-2023-0004234

(51) Int. Cl.
  *G06F 16/00*     (2019.01)
  *G06F 16/21*     (2019.01)
  *G06F 16/23*     (2019.01)
  *G06F 16/245*    (2019.01)
  *G06F 16/28*     (2019.01)

(52) U.S. Cl.
  CPC ........ *G06F 16/212* (2019.01); *G06F 16/2379* (2019.01); *G06F 16/245* (2019.01); *G06F 16/284* (2019.01)

(58) Field of Classification Search
  None
  See application file for complete search history.

(56) References Cited

U.S. PATENT DOCUMENTS

| | | | |
|---|---|---|---|
| 11,281,665 B2* | 3/2022 | Das | G06F 16/2379 |
| 11,314,716 B2 | 4/2022 | Lee et al. | |
| 11,321,344 B2 | 5/2022 | Karl et al. | |
| 11,669,539 B2* | 6/2023 | Karl | G06F 16/23 707/769 |
| 2019/0361888 A1* | 11/2019 | Das | G06F 16/22 |
| 2021/0089540 A1* | 3/2021 | Karl | G06F 16/24552 |

(Continued)

*Primary Examiner* — Farhan M Syed
(74) *Attorney, Agent, or Firm* — Seed IP Law Group LLP

(57) ABSTRACT

A method for managing a virtual database example includes acquiring a first query related to a first object of a first virtual database, issuing an ownership of the first object through a first master front end node corresponding to the first virtual database, and altering first meta information of the first object according to the first query, through a first process which acquires the ownership of the first object. The method also includes requesting an invalidation of a first data dictionary cache about the first meta information of the first object through the first master front end node, receiving a first completion signal indicating that the invalidation of the first data dictionary cache is completed, performing first commit for an alteration of the first meta information of the first object, and collecting the issued ownership of the first object.

20 Claims, 4 Drawing Sheets

(56) References Cited

U.S. PATENT DOCUMENTS

| | | | |
|---|---|---|---|
| 2021/0089552 A1* | 3/2021 | Karl | G06F 16/2455 |
| 2022/0300503 A1* | 9/2022 | Neugebauer | G06F 16/245 |
| 2022/0398232 A1* | 12/2022 | Sunder | G06F 16/27 |
| 2024/0134849 A1* | 4/2024 | Jeong | G06F 16/2448 |
| 2024/0232186 A9* | 7/2024 | Jeong | G06F 16/2425 |

* cited by examiner

APPARATUS AND METHOD FOR MANAGING VIRTUAL DATABASE

CROSS-REFERENCE TO RELATED APPLICATIONS

This application claims the benefit of Korean Application No. 10-2023-0004234, filed on Jan. 11, 2023, which is hereby incorporated by reference in its entirety.

In cases where the present application conflicts with a document incorporated by reference, the present application controls.

TECHNICAL FIELD

The present disclosure relates to a field of data processing, and more particularly, to a method and apparatus for managing a virtual database.

DESCRIPTION OF THE RELATED ART

A database technique of the related art has assumed that data is dependent on a particular database. In a distributed database environment, in order to allow a plurality of databases to use the same data, data needs to be replicated and physically stored in each database. When the plurality of databases uses the same data in a large-scale database environment such as a cloud, when the data is replicated and physically stored in each database, redundant data is duplicated and synchronization between databases is necessary, which causes a lot of loads. Accordingly, a virtual database is used to allow direct access without replicating the data.

According to the database technique of the related art, when it is necessary to change meta data in one database, contention between data definition languages (DDL) is controlled by means of lock. The lock may guarantee serializability by mutual exclusion to prevent another transactions from accessing the data until one transaction finishes all the operations on the data accessed first. However, a large-scale database used in the cloud may be operated by bundling a plurality of databases into one database. In this case, the lock contention becomes more severe and two or more processes request the other's resource so that the task may not be properly performed due to the occurrence of deadlock in which both cannot perform the task. Accordingly, a data processing method of a virtual database which reduces a possibility of deadlocks in accordance with the large-scale database environment may be necessary.

RELATED ART DOCUMENT

Patent Document

U.S. Pat. No. 11,314,716 (issued on Apr. 26, 2022)

BRIEF SUMMARY

According to some methods in the related art, one data belongs to only one database so that it is just necessary to control and reflect the DDL in the corresponding database. However, if a plurality of virtual databases which shares specific data controls and reflects the DDL only in one virtual database, it may not be reflected in the other database. Accordingly, there is some technical benefit to have a structure which manages a plurality of virtual databases which shares specific data, rather than managing only one database.

The present disclosure provides one or more embodiments that addresses the various technical problems described in the related art section.

However, the technical benefits of the present disclosure are not limited to the aforementioned ones and other technical benefits which are not mentioned will be apparently appreciated by those skilled art from the following description.

In order to achieve one or more technical benefits, according to some example embodiments of the present disclosure, a method performed by a computing device for managing a virtual database, includes acquiring a first query related to a first object of a first virtual database; issuing an ownership of the first object through a first master front end node corresponding to the first virtual database; altering first meta information of the first object according to the first query, through a first process which acquires the ownership of the first object; requesting an invalidation of a first data dictionary cache about the first meta information of the first object, to at least one proxy corresponding to at least one front end node included in the first virtual database, through the first master front end node; receiving a first completion signal indicating that the invalidation of the first data dictionary cache is completed, from the at least one proxy; performing first commit for an alteration of the first meta information of the first object, by means of the first process; and collecting the issued ownership of the first object.

In some embodiments, after the issuing of the ownership of the first object through the first master front end node corresponding to the first virtual database, the method further includes: requesting the invalidation of a first data table cache to a first back end node including the first data table cache about the first meta information of the first object, among at least one back end node included in the first virtual database, by means of the first master front end node; and receiving a second completion signal indicating that the invalidation of the first data table cache is completed, from the first back end node.

In some embodiments, when the at least one proxy receives an invalidation request signal of the first data dictionary cache, the at least one proxy invalidates the first data dictionary cache based on a scheduling with the dictionary request signal about the first meta information of the first object.

In some embodiments, the first object is a data structure to perform at least one of storage, processing, or utilization of data in a database management system (DBMS).

In some embodiments, the ownership of the first object is an authority to perform at least one of creation, alteration, duplication, or deletion of the first object.

In some embodiments, the first meta information of the first object includes at least one of identification information of a table included in the first object or attribute information of the table.

In some embodiments, the acquiring of the first query includes: determining whether the first object is shared by two or more virtual databases; issuing the ownership of the first object through a grand master node which manages the first virtual database and a second virtual database which share the first object, when the first object is shared; altering second meta information of the first object according to the first query, by means of a second process which acquires the ownership of the first object; requesting the invalidation of a second data dictionary cache about the second meta information of the first object, to the first master front end node and a second master front end node corresponding to the second virtual database, through the grand master node;

receiving a third completion signal indicating that the invalidation of the second data dictionary cache is completed, from the first master front end node and the second master front end node; performing second commit for the alteration of the second meta information of the first object, by means of the second process; and collecting the issued ownership of the first object.

In some embodiments, when the first object is shared, after issuing the ownership of the first object through the grand master node which manages the first virtual database and the second virtual database which share the first object; the method further includes requesting the invalidation of a second data table cache about the second meta information of the first object, to the first master front end node and the second master front end node, through the grand master node; and receiving a fourth completion signal indicating that the invalidation of the second data table cache is completed, from the first master front end node and the second master front end node.

In some embodiments, an alteration subject or an altering method of the meta information of the first object varies depending on whether to share the first object.

In some embodiments, the computing device includes a plurality of virtual databases, each of the plurality of virtual databases includes at least one front end node including a master front end node which manages nodes in the virtual database and at least one back end node, the computing device includes a grand master node which manages nodes of the plurality of virtual databases, and each of the at least one front end node includes a proxy.

In some embodiments, the computing device includes a plurality of virtual databases, the plurality of virtual databases is generated at a schema level, and the plurality of schemas corresponding to the plurality of virtual databases is configured before generating the plurality of virtual databases.

In some embodiments, the first virtual database, among the plurality of virtual databases, includes a first schema and a second schema and among the plurality of schemas, the first schema may be shared by the first virtual database and a second virtual database, among the plurality of virtual databases.

In some embodiments, a non-transitory computer readable medium including a computer program, wherein the computer program comprises instructions for causing a processor of a computing device for managing a virtual database to perform following steps, the steps comprising: acquiring a first query related to a first object of a first virtual database; issuing an ownership of the first object through a first master front end node corresponding to the first virtual database; altering first meta information about the first object according to the first query, through a first process which acquires the ownership of the first object; requesting an invalidation of a first data dictionary cache about the first meta information of the first object, to at least one proxy corresponding to at least one front end node included in the first virtual database, through the first master front end node; receiving a first completion signal indicating that the invalidation of the first data dictionary cache is completed, from the at least one proxy; performing first commit for an alteration of the first meta information of the first object, by means of the first process; and collecting the issued ownership of the first object.

In some embodiments, a computing device for managing a virtual database including: a processor; and a storage unit which stores a computer program executable by the processor. The processor is configured to acquire a first query related to a first object of a first virtual database, issue an ownership of the first object through a first master front end node corresponding to the first virtual database, alter first meta information about the first object according to the first query, through a first process which acquires the ownership of the first object, request an invalidation of a first data dictionary cache about the first meta information of the first object, to at least one proxy corresponding to at least one front end node included in the first virtual database, through the first master front end node, receive a first completion signal indicating that the invalidation of the first data dictionary cache is completed, from the at least one proxy, perform first commit for an alteration of the first meta information of the first object, by means of the first process, and collect the issued ownership of the first object.

According to the example embodiments of the present disclosure, the method may efficiently manage a virtual database.

Effects to be achieved in the present disclosure are not limited to the aforementioned effects, and other not-mentioned effects will be obviously understood by those skilled in the art from the description below.

BRIEF DESCRIPTION OF THE SEVERAL VIEWS OF THE DRAWINGS

Various aspects will be described with reference to the drawings and like reference numerals collectively designate like elements. In the following example embodiments, a plurality of specific details will be suggested for more understanding of one or more aspects for the purpose of description. However, it will be apparent that the aspect(s) will be embodied without having the specific details.

DETAILED DESCRIPTION

Figure 1:
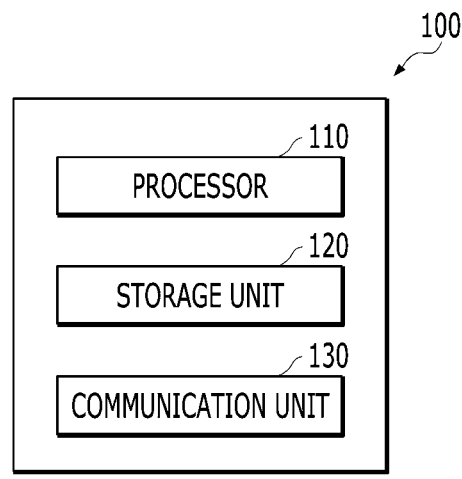
FIG. 1 schematically illustrates a block diagram of a computing device according to some example embodiments of the present disclosure.

Various example embodiments will now be described with reference to the drawings. In the specification, various descriptions are suggested to provide understanding of the present disclosure. However, it is obvious that the example embodiments may be embodied without having the specific description.

Terminologies such as "component," "module," or "system" used in the specification indicate a computer-related entity, hardware, firmware, software, a combination of software and hardware, or execution of software. For example, a component may be a procedure which is executed in a processor, a processor, an object, an execution thread, a program and/or a computer, but is not limited thereto. For example, both an application which is executed in a computing device and a computing device may be a component. One or more components may be stayed within the processor and/or execution thread. One component may be localized in one computer. One component may be distributed between two or more computers. Such components may be executed from various computer readable media having various data structures stored therein. The components may communicate with each other through local and/or remote processings in accordance with a signal (for example, data transmitted through other systems and a network such as Internet through data and/or a signal from one component which interacts with other components in a local system or a distributed system) having one or more data packets for example.

A terminology "or" is intended to refer to not exclusive "or," but inclusive "or." That is, when it is not specified or unclear in the context, "X uses A or B" is intended to mean one of natural inclusive substitutions. That is, when X uses A; X uses B; or X uses both A and B, "X uses A or B" may be applied to any of the above instances. Further, it should be understood that the term "and/or" used in this specification designates and includes all available combinations of one or more items among listed related items.

The term "comprise" and/or "comprising" is understood that the corresponding feature and/or component are present. However, it should be understood that a term "include" and/or "including" does not preclude existence or addition of one or more other features, constituent elements and/or these groups. Further, when it is not separately specified or it is not clear from the context to indicate a singular form, the singular form in the specification and the claims is generally interpreted to represent "one or more."

The term "at least one of A or B" shall be construed as meaning "only A is included," "only B is included," and "combined by combinations of A and B."

Those skilled in the art will further appreciate that the various illustrative logical blocks, configurations, modules, circuits, means, logics, and algorithm steps described in connection with the embodiments disclosed herein may be implemented as electronic hardware, computer software, or combinations thereof. To clearly illustrate the interchangeability of hardware and software, various illustrative components, blocks, configurations, means, logics, modules, circuits, and steps have been described above generally in terms of their functionality. Whether the functionality is implemented as hardware or software depends on a specific application and design constraints imposed on the overall system. Those skilled in the art may implement the described functionality in various ways for each of specific applications. However, decisions of such implementations should be interpreted without departing from the scope of the present disclosure.

Description of the suggested example embodiments is provided to allow those skilled in the art to use or embody the present disclosure. Various modifications to these embodiments may be apparent to those skilled in the art. Generic principles defined herein may be applied to other embodiments without departing from the scope of the present disclosure. Therefore, the present disclosure is not limited to the embodiments suggested herein. The present disclosure shall to be interpreted within the broadest scope consistent with principles suggested herein and novel features.

Description of the suggested example embodiments is provided to allow those skilled in the art to use or embody the present disclosure. Various modifications to these embodiments may be apparent to those skilled in the art. Generic principles defined herein may be applied to other embodiments without departing from the scope of the present disclosure. Therefore, the present disclosure is not limited to the embodiments suggested herein.

In the present disclosure, terms expressed by a "N-th" such as first, second, or third are used to distinguish a plurality of entities. For example, entities expressed with a first and a second may be identical or different. Terms expressed by "1-1-th" and "1-2-th" and terms expressed by "2-1-th" and "2-2-th" are also used to distinguish a plurality of entities.

In the present disclosure, schema refers to describing an overall specification about a structure of the database and constraints. For example, a schema includes an attribute which represents a characteristic of a specific object, an object which is configured by a set of attributes, and a definition about a relation existing between objects. As an additional example, the schema includes constraints which need to be maintained between objects.

In some example embodiments of the present disclosure, meta information about the schema includes meta information of an object belonging to the schema and meta information of a table space in which the object is stored.

The object in the present disclosure may be a data structure to perform at least one of storage, processing, or utilization of data in a database management system (DBMS). For example, the object includes a table which is a storage space having a structure of rows and columns to hold actual data, an index for quickly searching for data stored in the table, a view corresponding to an object in which SELECT statement is stored, and a sequence corresponding to an object for managing ascending numbers.

In some example embodiments of the present disclosure, meta information of the object includes identification information of a table included in an object and attribute information of the table. For example, the identification information of the table includes information representing a name of the table.

In some example embodiments of the present disclosure, meta information of a table space includes identification information of a table space in which the table is stored.

In the present disclosure, the table space refers to a space which stores data or a data structure. For example, the table space may correspond to a physical part of the database. For example, the table space may refer to a logical data storage structure configured by one or more data files.

FIG. 1 is a schematic block diagram of a computing device according to some example embodiments of the present disclosure.

A configuration of the computing device 100 illustrated in FIG. 1 is just a simplified example. In an example embodiment of the present disclosure, the computing device 100 may include other configurations for performing a computing environment of the computing device 100 or only some of the disclosed configurations may configure the computing device 100.

In the present disclosure, the computing device 100 may refer to a node which configures a system for implementing the example embodiments of the present disclosure. The computing device 100 refers to an arbitrary type of client or an arbitrary type of server. Components of the above-described computing device 100 are illustrative so that some components may be excluded or some components may be included. For example, when the above-described computing device 100 includes a client, an output unit (not illustrated) and an input unit (not illustrated) may be included in a range thereof.

For example, a client refers to a node (nodes) in a database system having a mechanism for communicating through a network. For example, the client may include a PC, a laptop computer, a workstation, a terminal and/or an arbitrary electronic device having network connectivity. Further, the client may include an arbitrary server which is implemented by at least one of an agent, an application programming interface (API), and a plug-in. For example, a client may be related to a user who uses a computing device 100 to perform database management. In this example, the client may issue various types of queries including a data definition language (DDL) to the computing device 100.

In some example embodiments of the present disclosure, the computing device 100 is a system in which users share a network resource and may be a cloud environment device which is borrowed by a user as much as needed to be used through a network at a desired time. For example, the computing device 100 includes a deployment model such as a public cloud, a private cloud, a hybrid cloud, and a community cloud, and a service model such as infrastructure as a service (IaaS), platform as a service (PaaS), and software as a service (Saas).

In some example embodiments of the present disclosure, a computing device 100 may include an arbitrary type of computer system or computer device such as a microprocessor, a main frame computer, a digital single processor, a portable device, and a device controller. For example, the computing device 100 includes a database server. Even though in FIG. 1, one computing device 100 is illustrated, more computing devices are also included in the scope of the present disclosure.

Referring to FIG. 1, the computing device 100 includes a processor 110, a storage unit 120, and a communication unit 130.

The processor 110 may be configured by one or more cores and may include a processor for data analysis and/or processing, such as a central processing unit (CPU) of a computing device, a general purpose graphics processing unit (GPGPU), and a tensor processing unit (TPU). The processor 110 reads a computer program stored in the storage unit 120 to perform data analysis and/or processing according to some example embodiments of the present disclosure.

The processor 110 generally controls the overall operation of the computing device 100. The processor 110 may process a signal, data, or information which is input or output through the above-described components included in the computing device 100 or drives the application programs stored in the storage unit 120 to provide and/or process appropriate information and/or functions to the user.

The processor 110 may control at least some of components of the computing device 100 to drive an application program stored in the storage unit 120. Moreover, the processor 110 may combine and operate at least two of components included in the computing device 100 to drive the application program.

The storage unit 120 may include at least one type of storage medium of flash memory type, hard disk type, multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and/or an optical disk.

In some example embodiments of the present disclosure, the storage unit 120 may refer to a volatile storage device which is a main storage device directly accessed by the processor 110 and instantly erases stored information when the power is turned off, such as a random access memory (RAM) including a dynamic random access memory (DRAM) and a static random access memory (SRAM), but is not limited thereto.

In some example embodiments of the present disclosure, the storage unit 120 includes a persistent storage and a database management system (DBMS). The storage unit 120 includes a buffer cache and data may be stored in a data block of the buffer cache. The data may be recorded in the persistent storage by a background process.

The persistent storage, for example, refers to non-volatile storages medium which consistently stores arbitrary data, such as a magnetic disk, an optical disk, and a magneto-optical storage device and a storage device based on a flash memory and/or a battery-backup memory. The persistent storage communicates with the processor 110 and the storage unit 120 of the computing device 100 by means of various communication units. The persistent storage is located at the outside of the computing device 100 to communicate with the computing device 100. The persistent storage is also referred to as a storage unit 120.

The DBMS may be implemented by the processor 110 on the storage unit 120. The DBMS may be a program to perform arbitrary operations of a database to search, insert, modify, and/or delete necessary data for the computing device 100.

In some example embodiments of the present disclosure, the storage unit 120 stores an arbitrary type of information which is generated or determined by the processor 110 and/or an arbitrary type of information received by the communication unit 130.

The storage unit 120 is a storage medium which stores computer software to allow the processor 110 to perform an operation according to the example embodiments of the present disclosure. Accordingly, the storage unit 120 may refer a software code necessary to carry out the example embodiments of the present disclosure, data to execute the code, and computer readable media to store a code execution result.

In some example embodiments of the present disclosure, the computing device 100 may operate in association with a web storage which performs a storage function of the storage unit 120 on the Internet. The description about the above-described storage unit 120 is just illustrative, but the present disclosure is not limited thereto.

In some example embodiments of the present disclosure, as the communication unit 130, an arbitrary wired/wireless communication network which transmits and receives arbitrary type of data and signals may be included in a network expressed in the present disclosure. The techniques described in this specification may be used not only in the above-mentioned networks, but also in other networks.

In some example embodiments of the present disclosure, the computing device 100 includes a plurality of virtual databases. The plurality of virtual databases may be configured and executed by the computing device 100. Here, the computing device 100 may refer to not only one entity, but also a combination of a plurality of entities. For example, the plurality of virtual databases may be configured and executed by one computing device 100. As another example, the plurality of virtual databases may be configured and executed by two or more computing devices.

The plurality of virtual databases operates as one database by connecting homogeneous or heterogeneous data scattered in various systems and application programs. For example, the plurality of virtual databases executes several subqueries in response to a single query to present a result value corresponding to the single query. The query refers to an arbitrary request or instruction which requests the processing in the virtual database. For example, the query (for example, a single query or a sub query) includes various forms including a data definition language (DDL). The query refers to an arbitrary request issued by a user or a developer. The query refers to an arbitrary request which is inserted into a front end node and/or a back end node and is processed in the front end node and/or the back end node.

The plurality of virtual database is generated at a schema level. For example, the computing device 100 may manage the meta information at a schema level, rather than a database level, so that the data is not dependent on a specific database. The computing device 100 may generate a schema to manage the meta information at the schema level. In one example embodiment, the computing device 100 maps a meta table space including meta information about the schema and the schema to generate a plurality of schemas.

The plurality of schemas corresponding to the plurality of virtual databases may be configured before generating the plurality of virtual databases. Accordingly, the plurality of schemas is generated before generating the plurality of virtual databases so that the plurality of virtual databases may be configured at the schema level.

In some example embodiments of the present disclosure, the plurality of virtual databases includes one or more schemas. For example, a first virtual database, among the plurality of virtual databases, includes a first schema and a second schema. Further, a second virtual database, among the plurality of virtual databases, includes the first schema. In the example, among the plurality of schemas, the first schema may be shared by the first virtual database and the second virtual database, among the plurality of virtual databases.

In some example embodiments of the present disclosure, the computing device 100 may configure a database which is virtualized by collecting related schemas in accordance with a usage purpose, after configuring the schema first. The computing device 100 according to one example embodiment of the present disclosure uses an existing schema without newly generating a separate schema when the virtual database is configured so that the schema may be reused to be shared by the plurality of virtual databases at the same time. Accordingly, the computing device 100 according to the example embodiment of the present disclosure configures and combines schemas in a distributed database environment to freely configure a plurality of virtual databases. Accordingly, there is no need to redundantly store the data to allow the virtual databases to use the same data in a table space so that the schema is shared by the plurality of virtual databases. Accordingly, a technical effect to efficiently manage the data may be achieved.

In some example embodiments of the present disclosure, the computing device 100 may use a separate management system to store or manage all the schemas and all global meta information related to the database.

In some example embodiments of the present disclosure, the plurality of virtual databases includes at least one front end node and at least one back end node.

At least one front end node may include a master front end node and/or a slave front end node. Further, at least one front end node includes a proxy.

The master front end node includes a master, a proxy, and a data dictionary cache.

The master may manage nodes in the virtual database. For example, the master may issue and/or collect an ownership of an object related to the query to execute the query. The ownership of the object may be an authority to perform at least one of creation, alteration, duplication, and deletion of the object.

In some example embodiments of the present disclosure, the master requests the invalidation of the data dictionary cache related to the query to the proxy included in each of at least one front end node. A data dictionary includes information for managing the database. The data dictionary cache may refer to a space in which information for managing the database is stored. The invalidation of the data dictionary cache refers to an operation of inactivating the stored information by deleting the information stored in the data dictionary cache or prohibiting the usage of the information.

The proxy receives a request signal from the master and performs the task in response to the request signal. For example, when the proxy receives a request signal of invalidation of the data dictionary cache from the master, the proxy invalidates the data dictionary cache.

In some example embodiments of the present disclosure, when the proxy receives a new request signal, the proxy performs the task based on a scheduling with a dictionary request signal which has been received in advance. For example, when the proxy receives a request signal of invalidation of the data dictionary cache, the proxy invalidates the data dictionary cache based on the scheduling with the dictionary request signal.

The slave front end node includes a proxy and a data dictionary cache. The slave front end node is controlled by a master of the master front end node.

At least one back end node receives a task request through the master front end node. For example, at least one back end node receives an invalidating request signal of a data table cache included in at least one back end node from the master front end node.

A data table includes a data value. A data table cache refers to a space in which a data value is stored. The invalidation of the data table cache refers to an operation of inactivating the stored information by deleting information stored in the data table cache and prohibiting the usage of the information. In some example embodiments of the present disclosure, the data table includes at least one schema.

In some example embodiments of the present disclosure, the computing device 100 includes a grand master node which manages nodes of the plurality of virtual databases.

The grand master node may control a master front end node included in the virtual database. The grand master node manages a task for the shared object. For example, the grand master node issues and/or collects an ownership of the shared object in response to the query related to an object shared by the first virtual database and the second virtual database.

Accordingly, the grand master node may issue and/or collect the ownership for the object shared by two or more virtual databases. The master front end node of the virtual database may issue and/or collect the ownership for the object which is not shared by the other virtual database.

The node in the present disclosure is used to indicate an entity in a virtual database system and is formed of a software module or a combination thereof.

In some example embodiments of the present disclosure, the processor 110 may acquire a first query related to a first object of the first virtual database. The first object may be a data structure to perform at least one of storage, processing, or utilization of data in a database management system (DBMS). The first query refers to an arbitrary request or instruction related to the first object in the first virtual database.

For example, the first query may include a request or an instruction to perform at least one of creation, alteration, duplication, or deletion of the first object in the first virtual database.

For example, a query in the present disclosure may be created based on a data definition language (DDL). The DDL is a SQL statement used to create, drop (truncate), or alter an object of the database.

In the present disclosure, the object includes a database, a table, an index, a view and/or a trigger and a DDL based query may be used to create the object.

The processor 110 issues an ownership of the first object through a first master front end node corresponding to the first virtual database. The ownership of the first object may be an authority to perform at least one of creation, alteration, duplication or deletion of the first object.

The processor 110 may alter first meta information of the first object according to the first query, by means of a first process which acquires an ownership of the first object. Accordingly, if necessary, the processor 110 issues an ownership of an object to prevent the meta information of the object from being altered by a process which does not have an ownership. The first process may be a program which is being executed to alter the first meta information of the first object. The first meta information of the first object may include at least one of identification information of a table included in the first object or attribute information of the table.

The processor 110 request the invalidation of a first data dictionary cache about the first meta information of the first object, to at least one proxy corresponding to at least one front end node included in the first virtual database, through the first master front end node.

At least one proxy may be included in at least one front end node (for example, a master front end node and a slave front end node) included in the first virtual database.

When at least one proxy receives an invalidation request signal of the first data dictionary cache, at least one proxy invalidates the first data dictionary cache based on the scheduling with the dictionary request signal about the first meta information of the first object. The processor 110 receives a first completion signal indicating that the invalidation of the first data dictionary cache is completed, from at least one proxy.

In some example embodiments of the present disclosure, the processor 110 requests the invalidation of the first data table cache to the first back end node including a first data table cache about the first meta information of the first object, among at least one back end node included in the first virtual database, through the first master front end node. The invalidation of the first data table cache refers to an operation of inactivating first meta information of the first object stored by deleting the first meta information of the first object stored in the first data table and prohibiting the usage of the first meta information.

The first back end node performs the invalidation of the first data table cache in response to the request of the invalidation of the first data table cache received from the first master front end node. The first back end node transmits a second completion signal indicating that the invalidation of the first data table cache is completed, to the computing device 100, after performing the invalidation of the first data table cache.

The processor 110 receives a second completion signal indicating that the invalidation of the first data table cache is completed, from the first back end node.

The processor 110 performs first commit for the alteration of the first meta information of the first object by the first process. When it is determined that the alteration of the first meta information of the first object is completed according to the first query, the first commit may be an operation of finishing the task according to the first query to complete the alteration.

The processor 110 collects an issued ownership of the first object. For example, the processor 110 may collect the ownership of the first object through the first master front end node.

In some example embodiments of the present disclosure, the processor 110 may determine whether the first object is shared by two or more virtual databases. For example, the processor 110 may determine whether the first object is shared by two or more virtual databases based on information about a first object stored in advance.

When the first object is shared, the processor 110 issues an ownership of the first object through a grand master node which manages the first virtual database and the second virtual database which share the first object. The grand master node may control a first master front end node included in the first virtual database and a second master front end node included in the second virtual database.

The processor 110 may alter second meta information of the first object according to the first query, by means of a second process which acquires an ownership of the first object. The second process may be a program which is being executed to alter the second meta information of the first object. The second meta information of the first object may include at least one of identification information of a table included in the first object or attribute information of the table. The second meta information of the first object may correspond to the first meta information of the first object or be different from the first meta information of the first object.

The processor 110 may request the invalidation of a second data dictionary cache about the second meta information of the first object, to the first master front end node and the second master front end node corresponding to the second virtual database, through the grand master node.

The first master front end node requests the invalidation of the second data dictionary cache about the second meta information of the first object, to at least one proxy corresponding to at least one front end node included in the first virtual database. The first master front end node may receive an invalidation completion signal of the second data dictionary cache indicating that the invalidation of the second data dictionary cache is completed, from at least one proxy corresponding to at least one front end node included in the first virtual database. The first master front end node transmits a third completion signal to the computing device 100 in response to the invalidation completion signal of the second data dictionary cache.

The second master front end node requests the invalidation of the second data dictionary cache about the second meta information of the first object, to at least one proxy corresponding to at least one front end node included in the second virtual database. The second master front end node may receive an invalidation completion signal of the second data dictionary cache indicating that the invalidation of the second data dictionary cache is completed, from at least one proxy corresponding to at least one front end node included in the second virtual database. The second master front end node transmits a third completion signal to the computing device 100 in response to the invalidation completion signal of the second data dictionary cache.

The processor 110 receives a third completion signal indicating that the invalidation of the second data dictionary cache is completed, from the first master front end node and the second master front end node.

The processor 110 may request the invalidation of the second data table cache about the second meta information of the first object, to the first master front end node and the second master front end node, through the grand master node.

The first master front end node requests the invalidation of the second data table cache to a third back end node including a second data table cache about the second meta information of the first object, among at least one back end node included in the first virtual database. The invalidation of the second data table cache refers to an operation of inactivating the second meta information of the first object stored by deleting second meta information of the first object stored in the second data table and prohibiting the usage of the second meta information.

The second master front end node requests the invalidation of the second data table cache to a third back end node including a second data table cache about the second meta information of the first object, among at least one back end node included in the second virtual database.

The third back end node may be a back end node shared by the first virtual database and the second virtual database.

The first master front end node and/or the second master front end node receives an invalidation completion signal of the second data table cache indicating that the invalidation of the second data table cache is completed, from the third back end node. The first master front end node and/or the second master front end node transmit a fourth completion signal to the computing device 100 in response to the invalidation completion signal of the second data table cache.

The processor 110 receives a fourth completion signal indicating that the invalidation of the second data table cache is completed, from the first master front end node and the second master front end node.

The processor 110 performs second commit for the alteration of the second meta information of the first object by the second process. When it is determined that the alteration of the second meta information of the first object is completed according to the first query, the second commit may be an operation of finishing the task according to the first query to complete the alteration.

The processor 110 collects an issued ownership of the first object. For example, the processor 110 may collect the ownership of the first object through the grand master node.

As described above, an alteration subject or an altering method of the meta information of the first object may vary depending on whether to share the first object.

Figure 2:
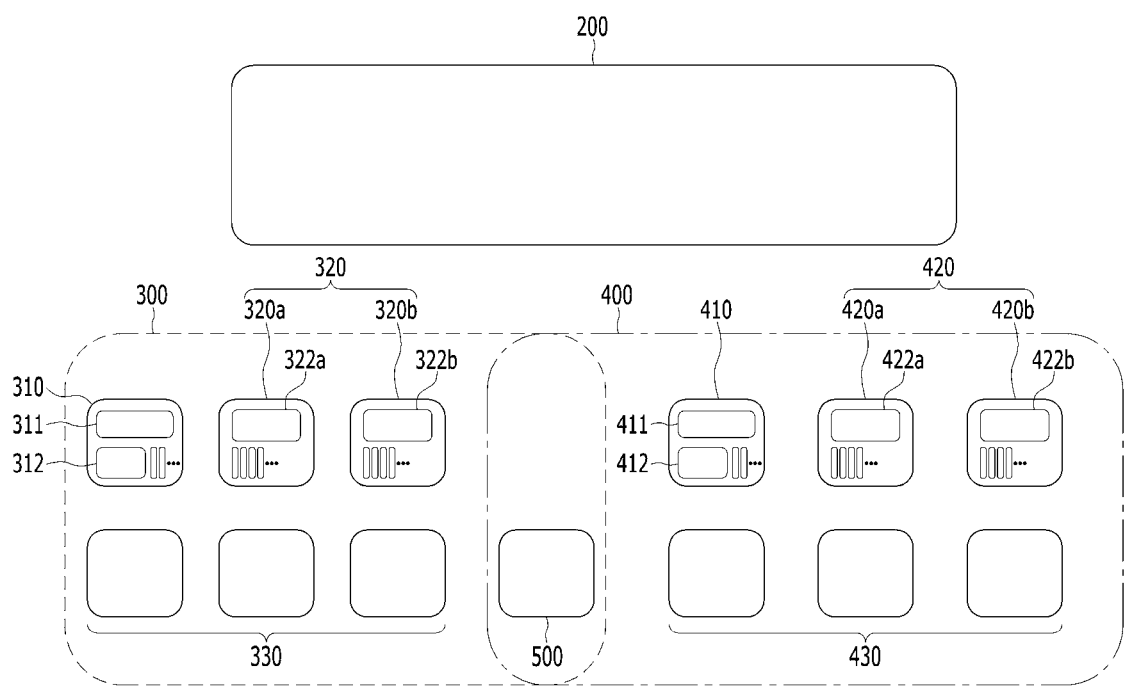
FIG. 2 illustrates a conceptual view for managing a virtual database according to some example embodiments of the present disclosure.

FIG. 2 is a conceptual view for managing a virtual database according to some example embodiments of the present disclosure.

Referring to FIG. 2, a grand master node 200, a first virtual database 300, and a second virtual database 400 may be configured and executed by a computing device 100. Here, the computing device 100 may refer to not only one entity, but also a combination of a plurality of entities. For example, a grand master node 200, a first virtual database 300 and a second virtual database 400 are combined by different computing devices to be configured and executed.

The grand master node 200 may control the first virtual database 300 and the second virtual database 400. For example, when a query related to an object shared by the first virtual database 300 and the second virtual database 400 is executed, the grand master node 200 issues an ownership about the shared object.

The grand master node 200 may manage the third back end node 500 including an object shared by controlling a first master front end node 310 of the first virtual database 300 and a second master front end node 410 of the second virtual database 400.

When an object shared by the plurality of virtual databases is processed by the plurality of virtual databases, the scheduling is not performed so that the alteration of the shared object may be duplicated or missed in some cases. However, the computing device 100 according to the present disclosure manages an object shared by the plurality of virtual databases through the grand master node 200 so that the alteration of the object may be accurately reflected.

The first virtual database 300 includes a first master front end node 310, a first slave front end node 320, a first back end node 330, and a third back end node 500.

When an object of the first virtual database which is not shared is processed, the first master front end node 310 may issue and/or collect the ownership of the object which is not shared. The first master front end node 310 controls nodes 310, 320, and 330 in the first virtual database 300.

When the shared object of the first virtual database is processed, the first master front end node 310 performs a task corresponding to the request of the grand master node 200 and controls a third back end node 500 including the shared object.

A first master 311 controls proxies 312, 322a, and 322b included in the first front end nodes 310 and 320 and back end nodes 330 and 500.

The proxies 312, 322a, and 322b included in the first front end nodes 310 and 320 perform a request signal received from the first master 311 based on the scheduling with a request signal received from the first master 311 and a previously received dictionary request signal.

The back end nodes 330 and 500 perform a task corresponding to the request signal received from the first master 311.

The second virtual database 400 includes a second master front end node 410, a second slave front end node 420, a second back end node 430, and a third back end node 500.

When an object of the second virtual database which is not shared is processed, the second master front end node 410 may issue and/or collect the ownership of the object which is not shared. The second master front end node 410 controls nodes 410, 420, and 430 in the second virtual database 400.

When the shared object of the second virtual database is processed, the second master front end node 410 performs a task corresponding to the request of the grand master node 200 and controls a third back end node 500 including the shared object.

A second master 411 controls proxies 412, 422a, and 422b included in the second front end nodes 410 and 420 and back end nodes 430 and 500.

The proxies 412, 422a, and 422b included in the second front end nodes 410 and 420 perform a request signal received from the second master 411 based on the scheduling with a request signal received from the second master 411 and a previously received dictionary request signal.

The back end nodes 430 and 500 perform a task corresponding to the request signal received from the second master 411.

Specific contents of components (for example, the computing device 100, the grand master node 200, the first virtual database 300, and the second virtual database 400) described in FIG. 2 may be replaced with the description with reference to FIG. 1.

Figure 3:
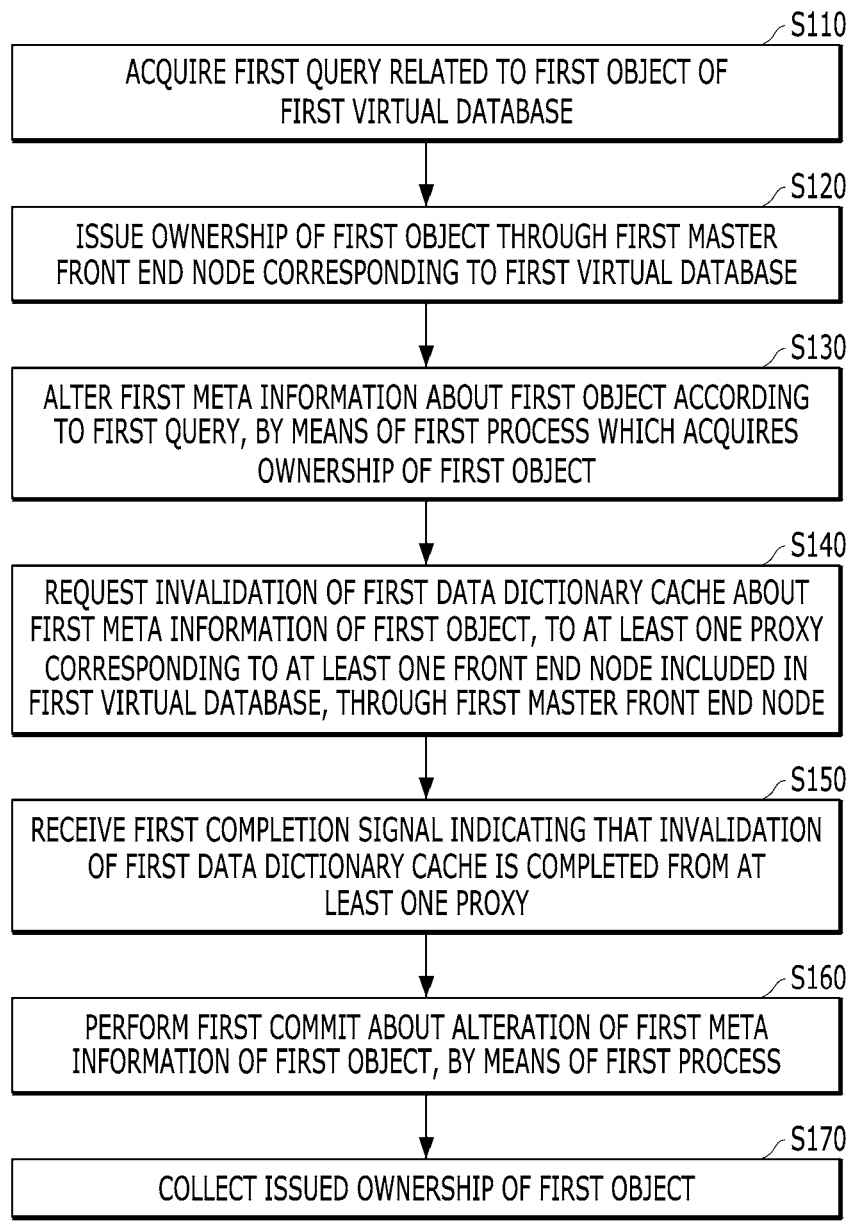
FIG. 3 illustrates an example flowchart for explaining a method for managing a virtual database performed in a computing device according to some example embodiments of the present disclosure.
Figure 4:
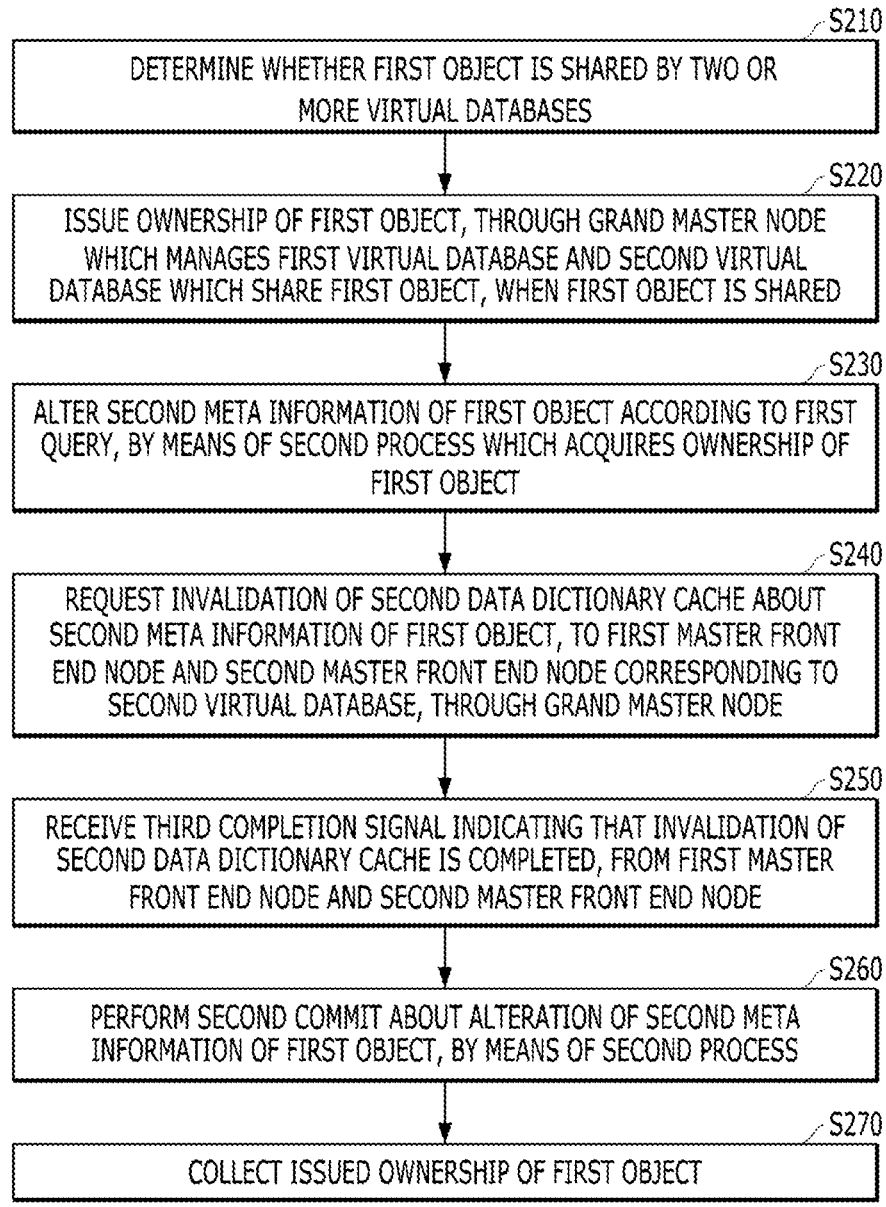
FIG. 4 illustrates another example flowchart for explaining a method for managing a virtual database performed in a computing device according to some example embodiments of the present disclosure.

FIGS. 3 and 4 are example flowcharts for explaining a method for managing a virtual database performed in a computing device according to some example embodiments of the present disclosure.

The computing device 100 may include a plurality of virtual databases. Each of the plurality of virtual databases includes at least one front end node including a master front end node which manages nodes in the virtual database and at least one back end node. The computing device 100 includes a grand master node which manages nodes of the plurality of virtual databases. At least one front end node includes a proxy.

The computing device 100 may include a plurality of virtual databases. The plurality of virtual database is generated at a schema level. The plurality of schemas corresponding to the plurality of virtual databases may be configured before generating the plurality of virtual databases.

A first virtual database, among the plurality of virtual databases, includes a first schema and a second schema. Among the plurality of schemas, the first schema may be shared by the first virtual database and the second virtual database, among the plurality of virtual databases.

Referring to FIG. 3, the processor 110 may acquire a first query related to a first object of the first virtual database in step S110. The first object may be a data structure to perform at least one of storage, processing, or utilization of data in a database management system (DBMS).

The processor 110 may issue an ownership of the first object, through a first master front end node corresponding to the first virtual database in step S120.

After the step S120, the processor 110 requests the invalidation of the first data table cache to a first back end node including a first data table cache about the first meta information of the first object, among at least one back end node included in the first virtual database, through the first master front end node. The processor 110 receives a second completion signal indicating that the invalidation of the first data table cache is completed, from the first back end node. The ownership of the first object may be an authority to perform at least one of creation, alteration, duplication or deletion of the first object. The first meta information of the first object may include at least one of identification information of a table included in the first object or attribute information of the table.

The processor 110 may alter first meta information of the first object according to the first query, by means of a first process which acquires an ownership of the first object in step S130.

The processor 110 requests the invalidation of the first data dictionary cache about the first meta information of the first object, to at least one proxy corresponding to at least one front end node included in the first virtual database by the first master front end node in step S140. When at least one proxy receives an invalidation request signal of the first data dictionary cache, at least one proxy invalidates the first data dictionary cache based on the scheduling with the dictionary request signal about the first meta information of the first object.

The processor 110 receives a first completion signal indicating the invalidation of the first data dictionary cache is completed, from at least one proxy in step S150.

The processor 110 performs first commit for the alteration of the first meta information of the first object by the first process in step S160.

The processor 110 collects an issued ownership of the first object in step S170.

Referring to FIG. 4, the processor 110 may determine whether the first object is shared by two or more virtual databases in step S110 (S210).

When the first object is shared, the processor 110 issues an ownership of the first object through a grand master node which manages the first virtual database and the second virtual database which share the first object in step S220.

After the step S220, the processor 110 may request the invalidation of the second data table cache about the second meta information of the first object, to the first master front end node and the second master front end node, through the grand master node.

The processor 110 receives a fourth completion signal indicating that the invalidation of the second data table cache is completed, from the first master front end node and the second master front end node.

The processor 110 may alter second meta information of the first object according to the first query, by means of a second process which acquires an ownership of the first object in step S230.

The processor 110 may request the invalidation of a second data dictionary cache about the second meta information of the first object, to the first master front end node and the second master front end node corresponding to the second virtual database, through the grand master node in step S240.

The processor 110 receives a third completion signal indicating that the invalidation of the second data dictionary cache is completed, from the first master front end node and the second master front end node in step S250.

The processor 110 performs second commit for the alteration of the second meta information of the first object by the second process in step S260.

The processor 110 collects an issued ownership of the first object in step S270.

As described above, an alteration subject or an altering method of the meta information of the first object may vary depending on whether to share the first object.

Steps illustrated in FIGS. 3 and 4 are example steps. Accordingly, it is obvious to those skilled in the art that some of the steps of FIGS. 3 and 4 are omitted or there may be additional steps without departing from the range of the spirit of the present disclosure. Further, specific contents of components (for example, the computing device 100) described in FIGS. 3 and 4 may be replaced with the description with reference to FIGS. 1 and 2.

As described in detail with reference to FIGS. 1 to 4, the computing device 100 which manages the virtual database according to the present disclosure may alter the object of the virtual database which is not shared through the master front end node in the virtual database. Further, the computing device 100 may alter the object which is shared by two or more virtual databases through the grand master node.

As described above, the computing device 100 may schedule the control of the query in one place of the large-scale database to reduce an error such as a deadlock.

When an object shared by the plurality of databases is processed by the plurality of databases, the scheduling is not performed so that the alteration of the shared object may be duplicated or missed in some cases. However, the computing device 100 according to the present disclosure manages an object shared by the plurality of virtual databases through the grand master node so that the alteration of the object may be accurately reflected.

Figure 5:
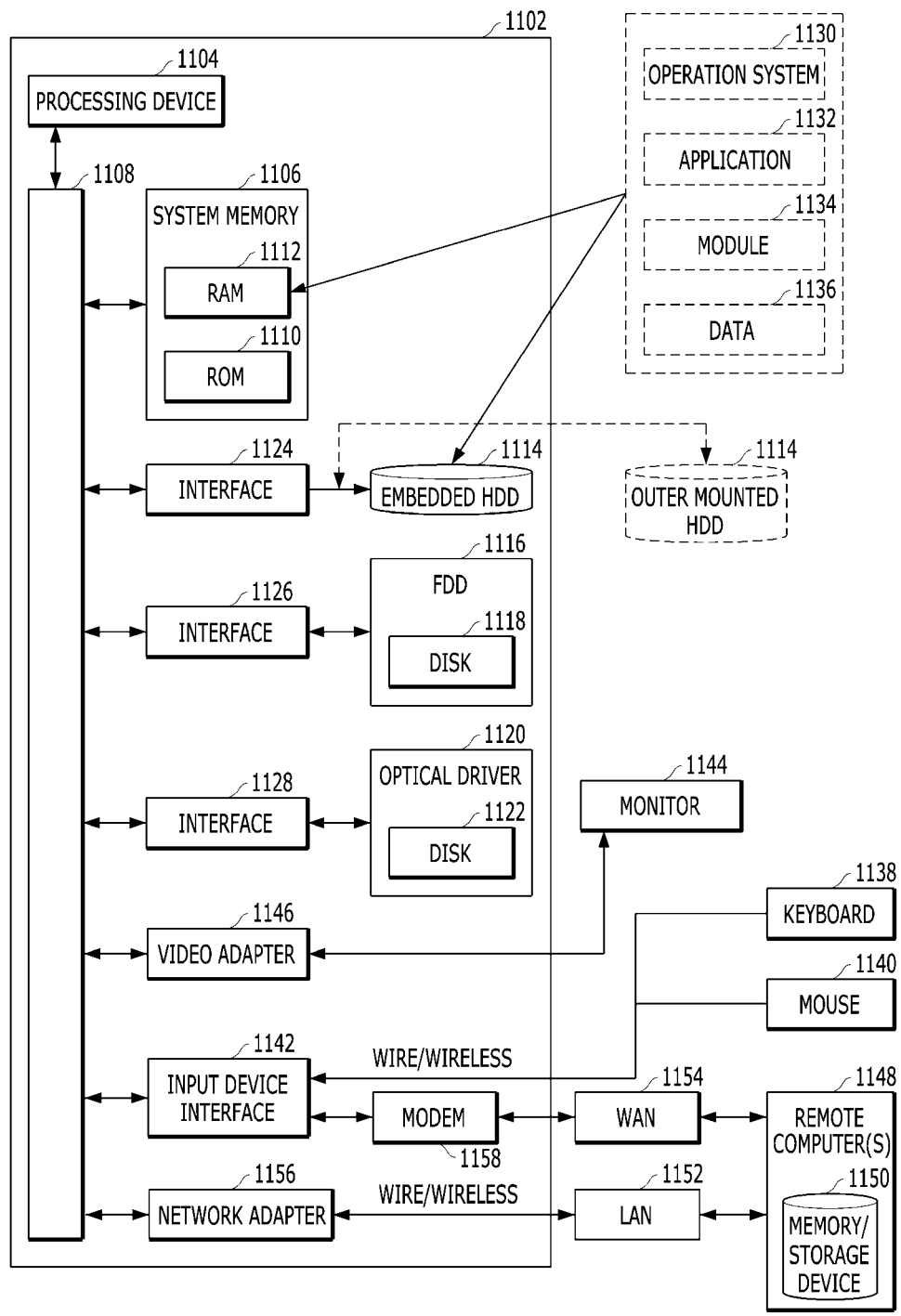
FIG. 5 illustrates a simple and general schematic view of an example computing environment in which example embodiments of the present disclosure are embodied.

FIG. 5 is a simple and general schematic diagram illustrating an example of a computing environment in which example embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The example embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an exterior mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the example embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various example embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented example embodiments is provided so as for those skilled in the art to use or carry out the present disclosure. Various modifications of the example embodiments may be apparent to those skilled in the art, and general principles defined herein may be applied to other example embodiments without departing from the scope of the present disclosure. Accordingly, the present disclosure is not limited to the example embodiments suggested herein, and shall be interpreted within the broadest meaning range consistent to the principles and new characteristics presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed by a computing device that includes one or more memories storing instructions and one or more processor configured to execute the instructions to manage a virtual database, the method comprising:
    acquiring a first query related to a first object of a first virtual database;
    issuing an ownership of the first object through a grand master node that manages a first master front end node corresponding to the first virtual database and a second master front end node corresponding to a second virtual database;
    altering first meta information of the first object according to the first query, by means of a first process which acquires the ownership of the first object;
    requesting an invalidation of a first data dictionary cache about the first meta information of the first object, through the grand master node and the first master front end node, to at least one proxy corresponding to at least one front end node included in the first virtual database;
    receiving a first completion signal indicating that the invalidation of the first data dictionary cache is completed, from the at least one proxy;
    performing first commit for an alteration of the first meta information of the first object, by means of the first process; and
    collecting, by the grand master node, the issued ownership of the first object.

2. The method according to claim 1, further comprising:
    after the issuing of the ownership of the first object through the grand master node that manages the first master front end node corresponding to the first virtual database,
    requesting the invalidation of a first data table cache to a first back end node including the first data table cache about the first meta information of the first object, among at least one back end node included in the first virtual database, by means of the first master front end node; and
    receiving a second completion signal indicating that the invalidation of the first data table cache is completed, from the first back end node.

3. The method according to claim 1, wherein when the at least one proxy receives an invalidation request signal of the first data dictionary cache, the at least one proxy invalidates the first data dictionary cache based on a scheduling with the dictionary request signal about the first meta information of the first object.

4. The method according to claim 1, wherein the first object is a data structure to perform at least one of storage, processing, or utilization of data in a database management system (DBMS).

5. The method according to claim 1, wherein the ownership of the first object is an authority to perform at least one of creation, alteration, duplication, or deletion of the first object.

6. The method according to claim 1, wherein the first meta information of the first object includes at least one of identification information of a table included in the first object or attribute information of the table.

7. The method according to claim 1, wherein the acquiring of the first query further includes:
    determining whether the first object is shared by two or more virtual databases;
    issuing the ownership of the first object through the grand master node which manages the first virtual database and the second virtual database which share the first object, when the first object is shared;
    altering second meta information of the first object according to the first query, by means of a second process which acquires the ownership of the first object;
    requesting the invalidation of a second data dictionary cache about the second meta information of the first object, to the first master front end node and a second master front end node corresponding to the second virtual database, through the grand master node;
    receiving a third completion signal indicating that the invalidation of the second data dictionary cache is completed, from the first master front end node and the second master front end node;
    performing second commit for the alteration of the second meta information of the first object, by means of the second process; and
    collecting the issued ownership of the first object.

8. The method according to claim 7, further comprising:
    when the first object is shared, after the issuing of the ownership of the first object through the grand master node which manages the first virtual database and the second virtual database which share the first object;
        requesting the invalidation of a second data table cache about the second meta information of the first object, to the first master front end node and the second master front end node, through the grand master node; and
        receiving a fourth completion signal indicating that the invalidation of the second data table cache is completed, from the first master front end node and the second master front end node.

9. The method according to claim 1, wherein an alteration subject or an altering method of the meta information of the first object varies depending on whether to share the first object.

10. The method according to claim 1, wherein the computing device includes a plurality of virtual databases, each of the plurality of virtual databases includes at least one front end node including a master front end node which manages nodes in the virtual database and at least one back end node, the computing device includes the grand master node which manages nodes of the plurality of virtual databases, and each of the at least one front end node includes a proxy.

11. The method according to claim 1, wherein the computing device includes a plurality of virtual databases, the plurality of virtual databases is generated at a schema level, and a plurality of schemas corresponding to the plurality of virtual databases is configured before generating the plurality of virtual databases.

12. The method according to claim 11, wherein the first virtual database, among the plurality of virtual databases, includes a first schema and a second schema and among the plurality of schemas, the first schema is shared by the first virtual database and the second virtual database, among the plurality of virtual databases.

13. A non-transitory computer readable medium including a computer program, wherein the computer program comprises instructions for causing a processor of a computing device for managing a virtual database to perform following steps, the steps comprising:
   acquiring a first query related to a first object of a first virtual database;
   issuing an ownership of the first object through a grand master node that manages a first master front end node corresponding to the first virtual database and a second master front end node corresponding to a second virtual database;
   altering first meta information about the first object according to the first query, through a first process which acquires the ownership of the first object;
   requesting an invalidation of a first data dictionary cache about the first meta information of the first object, through the grand master node and the first master front end node, to at least one proxy corresponding to at least one front end node included in the first virtual database;
   receiving a first completion signal indicating that the invalidation of the first data dictionary cache is completed, from the at least one proxy;
   performing first commit for an alteration of the first meta information of the first object, by means of the first process; and
   collecting, by the grand master node, the issued ownership of the first object.

14. A computing device for managing a virtual database, the computing device comprising:
   a processor; and
   a storage unit which stores a computer program executable by the processor,
   wherein the processor is configured to execute the computer program to:
      acquire a first query related to a first object of a first virtual database;
      issue an ownership of the first object through a grand master node that manages a first master front end node corresponding to the first virtual database and a second master front end node corresponding to a second virtual database;
      alter first meta information about the first object according to the first query, through a first process which acquires the ownership of the first object;
      request an invalidation of a first data dictionary cache about the first meta information of the first object, through the grand master node and the first master front end node, to at least one proxy corresponding to at least one front end node included in the first virtual database;
      receive a first completion signal indicating that the invalidation of the first data dictionary cache is completed, from the at least one proxy;
      perform first commit for an alteration of the first meta information of the first object, by means of the first process; and
      collect, by the grand master node, the issued ownership of the first object.

15. The computing device of claim 14, wherein the processor is further configured to:
   after the issuing of the ownership of the first object through the grand master node that manages the first master front end node corresponding to the first virtual database,
   request the invalidation of the first data table cache to a first back end node including the first data table cache about the first meta information of the first object, among at least one back end node included in the first virtual database, by means of the first master front end node; and
   receive a second completion signal indicating that the invalidation of the first data table cache is completed, from the first back end node.

16. The computing device of claim 14, wherein the processor is further configured to:
   when the at least one proxy receives an invalidation request signal of the first data dictionary cache, the at least one proxy invalidates the first data dictionary cache based on a scheduling with the dictionary request signal about the first meta information of the first object.

17. The computing device of claim 14, wherein the first object is a data structure to perform at least one of storage, processing, or utilization of data in a database management system (DBMS).

18. The computing device of claim 14, wherein the ownership of the first object is an authority to perform at least one of creation, alteration, duplication, or deletion of the first object.

19. The computing device of claim 14, wherein the first meta information of the first object includes at least one of identification information of a table included in the first object or attribute information of the table.

20. The computing device of claim 14, wherein the processor acquires the first query by being further configured to:
   determine whether the first object is shared by two or more virtual databases;
   issue the ownership of the first object through the grand master node which manages the first virtual database and the second virtual database which share the first object, when the first object is shared;
   alter second meta information of the first object according to the first query, by means of a second process which acquires the ownership of the first object;
   request the invalidation of a second data dictionary cache about the second meta information of the first object, to the first master front end node and a second master front end node corresponding to the second virtual database, through the grand master node;
receive a third completion signal indicating that the invalidation of the second data dictionary cache is completed, from the first master front end node and the second master front end node;
perform second commit for the alteration of the second meta information of the first object, by means of the second process; and
collect the issued ownership of the first object.

* * * * *